United States Patent [19]

Keith et al.

[11] Patent Number: 4,631,126
[45] Date of Patent: Dec. 23, 1986

[54] FILTER INSERT SYSTEM

[75] Inventors: Robert C. Keith, Wellesley, Mass.; Teunis VandenBerg, Walnut, Calif.; Marshall C. Randolph, Wellesley, Mass.; Thomas B. Lewis, Mount Laurel, N.J.; Patrick J. Gillis, Jr., Stoughton, Mass.

[73] Assignee: Vacco Industries, South El Monte, Calif.

[21] Appl. No.: 436,642

[22] Filed: Oct. 25, 1982
(Under 37 CFR 1.47)

[51] Int. Cl.[4] .............................................. B01D 29/38
[52] U.S. Cl. ................... 210/108; 210/333.01; 210/411
[58] Field of Search ............... 210/108, 333.01, 333.1, 210/410, 411, 412

[56] References Cited

U.S. PATENT DOCUMENTS

| | | | |
|---|---|---|---|
| 2,570,132 | 10/1951 | Koupal | 210/410 |
| 2,767,851 | 10/1956 | Muller | 210/333.01 |
| 2,772,789 | 12/1956 | Gardes | 210/108 X |
| 3,289,839 | 10/1966 | Muller | 210/108 |

Primary Examiner—John Adee
Attorney, Agent, or Firm—Frederick E. Mueller

[57] ABSTRACT

A cylindrical insert for a pre-existing pressure vessel has an integral accumulator chamber defining a head for the vessel. Inner end surfaces of the accumulator chamber, along with the walls of the pressure vessel, define a filter element chamber, the inner end of the accumulator chamber also supporting an array of permanent filter elements. The accumulator chamber is of annular form, around a central pipe which serves, alternately, as the outlet for filtered fluid passing from the filter chamber or as the inlet for filtered clean fluid to be forcefully pulsed back through the filter elements by the release of compressed air from the accumulator to flush them of an accumulation of filtered waste material. The insert system includes piping associated with the accumulator chamber for charging the chamber with highly compressed air and for selectively releasing the charge for backflushing, and control valves for placing the insert system in filtering and backflushing modes. The accumulator volume is so proportioned, relative to the volume of the system communicating therewith during backflushing, that the equilibrium pressure during backflushing cannot exceed the pressure rating of the vessel.

17 Claims, 2 Drawing Figures

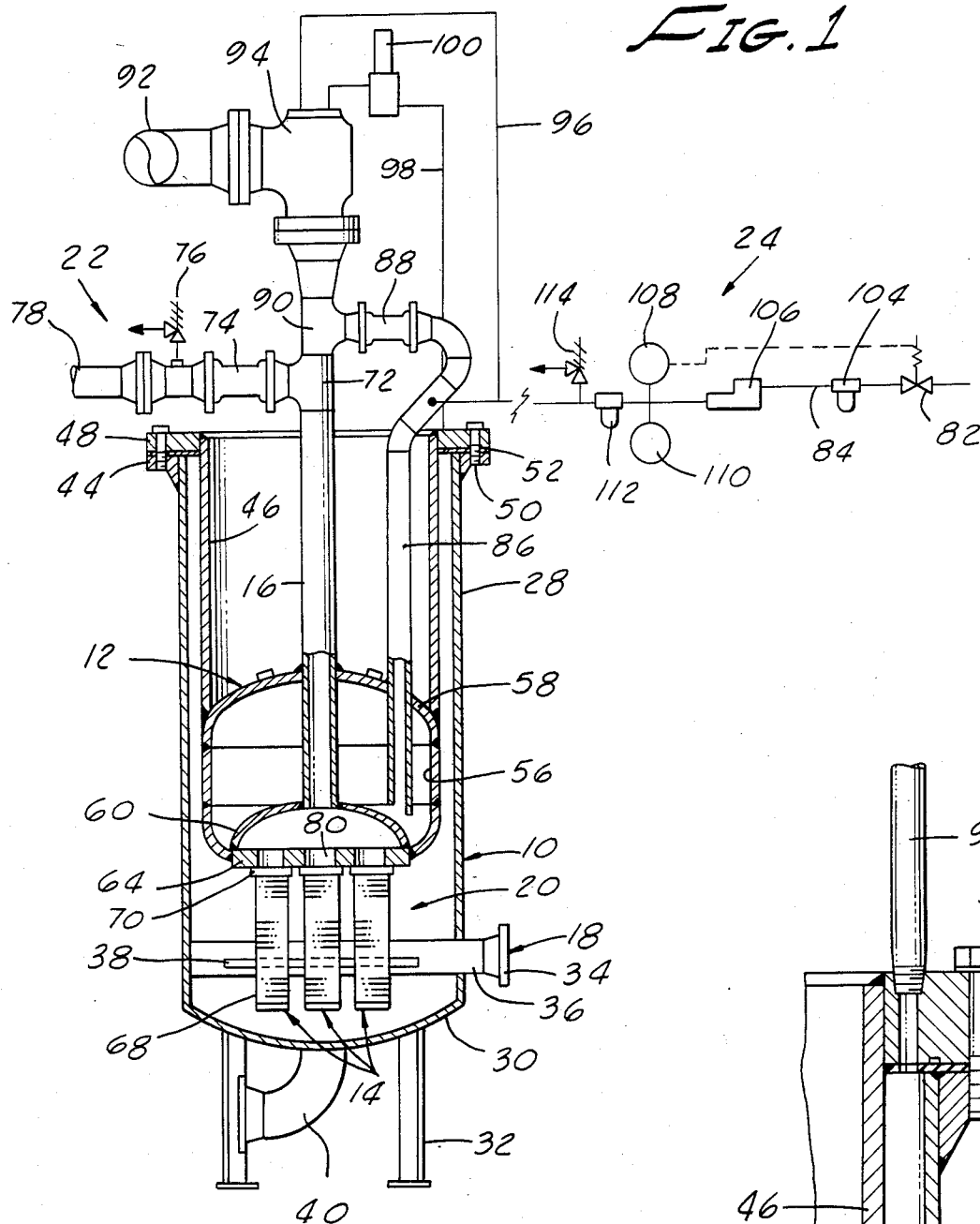

FILTER INSERT SYSTEM

BACKGROUND OF THE INVENTION

The present invention relates to filter systems, and in particular, to an improved permanent filter system incorporating an integral backflush means which may, if desired, be utilized as an insert to retrofit pre-existing pressure vessels.

Many fluid handling systems require a filter system to remove contaminants from the fluid being handled. As is well known in the art, a variety of filter media are available for the purpose. The filter material may be temporary in nature such as, for example, diatomaceous earth or powdered ion exchange resin, which forms what is known as a "precoat" that is commonly packed around or supported on apertured hollow pipes or the like. Alternatively, the filter may be permanent in nature, such as porous sintered metal or compressed stacks of discs, each formed on at least one face with passages, sometimes referred to as edge filtration filters. In some critical applications, the filter medium must be housed in expensive pressure vessels meeting the requirements of the ASME Boiler and Pressure Vessel Code as in, for example, nuclear power stations. While not so limited, the present invention has special utility in filter systems of the pressurized vessel type.

Many nuclear power stations utilize precoat filter/demineralizers for a variety of filtration applications. While precoat filter material has been effective, experience has long ago demonstrated that the use of that material inherently involves several significant disadvantages. The precoat filter medium must be replaced very frequently; its use involves a high ratio of precoat material required to waste filtered, on the order of 10:1, and involves high costs for processing, packaging, shipping and disposing of the material; precoat material requires an extremely large volume of water for backwashing operations, which involve relatively long periods of time.

In precoat filtering systems of the type requiring an expensive pressure vessel, it has long been recognized as desirable to replace the system with a system of the type utilizing permanent filter elements. However, such dismantling or conversion of precoat filter systems has not heretofore been feasible because of the expense involved, especially in nuclear energy facilities. A significant element of this expense is the loss of the pre-existing pressure vessel, the sacrifice of which typically increase the cost of conversion to a permanent filter system to a prohibitive level.

SUMMARY OF THE INVENTION

The present invention provides a practical, economical means of retrofitting a pressure vessel with a permanent filter system. To that end, the invention comprises an accumulator chamber or vessel adapted to serve as a replacement head for the pre-existing pressure vessel, the accumulator chamber being fitted within the body of the pre-existing pressure vessel with at least a slight annular clearance. The accumulator chamber may, if necessary in a particular case, be fitted with a cylindrical skirt having an outer end fitted with a flange adapted for gasketed mating engagement with the flange of the pre-existing pressure vessel. The innermost end of the accumulator chamber is fitted with a perforated mounting plate providing a fixed support for inwardly projecting fixed permanent filter elements. The permanent filter elements are preferably of cylindrical configuration with the axial openings at one end communicating with the openings in the mounting plate. The accumulator chamber is annular around a central pipe having fluid communication with an outlet for normally conducting filtered fluid outwardly, the central pipe also being associated with a conduit system for supplying compressed air to the interior of the accumulator chamber. The central pipe also has communication with a pressure relief valve operatively associated with the compressed air supply system and conduit system. The compressed air supply system is valve controlled, such that when the normal outlet for filtered fluid is closed, when the filter system is taken offstream for backflushing operations, a sudden blast of compressed air is delivered from the accumulator chamber reversely through the central pipe for backflushing the permanent filter elements. The accumulator chamber volume and the volume of the passages therefrom to the filter chamber, and the filter chamber, are sized such that the equilibrium pressure resulting from the relatively high pressure backwash air volume expanding through the associated piping and through the filter elements into the filter chamber cannot exceed the pressure rating of the pre-existing pressure vessel. A backwash valve to the sludge tank for receiving the backwash effluent is electrically interlocked with the air control valve to insure that the liquid in the filter vessel has been drained to the sludge tank prior to backwashing. The pressure relief valve for the system relieves the pressurizing source to prevent over-pressurization of the filter vessel and includes a sensor pipe terminus in fluid pressure communication with the annulus between the accumulator chamber vessel and the inner wall of the pre-existing pressure vessel. Incorporating the accumulator system into the filter system vessel greatly minimizes the expense of retrofitting since the accumulator also acts as a head of the vessel and eliminates the external plumbing associated with the conventional placement of an accumulator at a location removed from the vessel, which is highly advantageous in retrofitting nuclear installations.

BRIEF DESCRIPTION OF THE DRAWINGS

FIG. 1 is a transverse partly sectional view schematically showing the filter system of the present invention in association with a schematically depicted control system.

FIG. 2 is a cross-sectional detail, on a larger scale, of the flange connection of the pressure vessel.

DESCRIPTION OF THE PREFERRED EMBODIMENT

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

In general, the filter system of the present invention comprises a pressure vessel 10 and an accumulator vessel or chamber 12 which also serves as a head closing one end of the pressure vessel. A plurality of permanent filters 14 are fixedly supported on the inner end of the accumulator chamber to be disposed within and housed in a filter chamber 20 of the closed pressure vessel. The accumulator chamber 12 is annular in configuration around an axis defined by a central length of pipe 16, one end of which is in fluid communication with the chamber 20 housing the filters 14, which in turn, receives the fluid to be filtered via a valve controlled inlet means 18 through the walls of the pressure vessel and into the filter chamber 20.

The external other end of the central pipe 16 communicates with a valve controlled normal outlet means 22 for exhausting the filtered fluid and, also, with a regulated compressed air supply system, designated generally by the numeral 24, that also has fluid communication with the interior of the accumulator chamber 12.

More particularly, for purposes of illustrating the special utility of the invention in retrofitting pre-existing pressure vessels, the vessel 10 of the drawing is depicted as one which formerly housed a precoat filter system for a liquid service. Thus, the vessel 10 comprises a relatively long, cylindrical wall section 28 that is closed at its lower end by an outwardly convex bottom head 30, the vessel being supported on a framework means 32. The inlet means 18 comprises an external flange fitting 34 communicating with a length of pipe 36 that extends through the wall 28 of the vessel and which, within the filter chamber 20, is formed with an outlet opening 38.

The bottom head 30 of the vessel 10 is also fitted with a waste outlet 40. While not shown in the drawings, it will be understood that the outlet 40 communicates with a waste sludge tank through a valve controlled piping system such that when the valve is opened, the waste solids which have been filtered out within the filter chamber can be drained or flushed into the waste tank.

Viewed as a retrofitted pressure vessel 10, the upper end of the vessel wall 28 is permanently fitted with a radially outwardly projecting annular flange 44 at a substantial distance above the upper end of the accumulator chamber 12. Such relationship would be more or less typical in the case of a retrofitted precoat filter system pressure vessel for the reason that, in such a system, a relatively large volume of precoat material and relatively long elements for the support of the precoat material are required; however, it is to be understood that in the case of an embodiment of the filter system of the present invention manufactured as an item of original equipment, a new pressure vessel would be constructed such that its upper end flange would be substantially at the level of the upper end of the accumulator chamber 12.

Manufactured as an insert system, the accumulator chamber 12 is permanently and rigidly secured, as by welding, to the lower end of a cylindrical skirt 46 whose upper end is fitted with a radially outwardly extending circular flange 48 adapted for mating engagement with the flange 44 of the vessel wall 28, e.g. by a circular array of fastener means 50. A gasket or other sealing means 52 is interposed between the opposed faces of the flanges 44, 48 in order to hermetically seal the enclosed volume of the pressure vessel 10.

The accumulator chamber 12 is, itself, essentially a pressure vessel constructed to ASME Boiler and Pressure Code standards. Thus, the accumulator comrises a cylindrical section 56 closed at its upper end by an annular domed section 58 and closed at its lower end by an annular inwardly dished section 60. As shown the central pipe 16 extends through the central openings of the sections 58 and 60, being secured thereto, as by welding, in a manner to effect an airtight pressure seal.

The skirt 46 and the cylindrical portion of chamber 12 are essentially of the same diameter so that both are coaxially equally spaced from the interior surface of the vessel container wall 28. With this arrangement, an annular space of relatively small radial extent, e.g. one inch, is left between the two surfaces such that the pressure within the annulus is essentially the same as the pressure conditions obtaining in the filter chamber 20. The annular space thus obtained is a feature employed in the control and regulation system for supplying compressed air to and safely discharging it from the accumulator chamber 12.

In order to support the filters 14, the inner end of the accumulator chamber 12 is fitted with a circular plate 64. As has been stated, the filters 14 are of the permanent type which do not employ any precoat material. Thus, the filters 14 may be viewed as constituting circularly spaced apart cylindrical lengths of a sintered metal material in tubular form, or as stacks of annular edge-filtration discs. Preferably, the several filters 14 are of the latter type comprising stacks of thin sheet metal discs chemically etched on at least one side with a predetermined flow pattern. As shown in U.S. Pat. No. 3,648,843, such discs are stacked one on top of the other and mechanically held im compression to form flow paths from the outer to the inner edges of the discs. The lower end of the stack in each case is closed by a plate 68 or the like, while the upper end of each filter is provided with a fitting 70 such that each filter is rigidly held in place with its longitudinal flow opening in fluid communication with a corresponding hole 80 through the mounting plate 64.

The upper end of the central pipe 16 is connected to a Tee 72 having one leg connected in fluid communication with the valve controlled filtered fluid outlet means 22. This means comprises an on/off valve 74 which, in turn, communicates downstream with a pressure relief valve 76 and then through another flanged fitting with a portion of the piping 78 for conducting the filtered liquid to a point of use, e.g., a filtered liquid collection tank.

The accumulator control and regulation means 24 includes a solenoid controlled source of compressed air 82 that is in fluid communication through piping 84 with a pipe 86 situated parallel to the central pipe 16 and which sealing penetrates the upper domed head 58 to have fluid communication with the interior of the accumulator chamber 12. The upper end of the piping 86 is fitted with a control valve 88 whose other end is in communication with another Tee 90 having one leg coupled to the first Tee 72. The remaining leg of the Tee 90 is coupled to a pilot operated relief valve 94 whose dump side has fluid communication through a system of piping 92 to atmosphere.

In order to regulate the pilot relief valve 94, it is communicated on one side with the high pressure air supply conduit 84 via branch piping 96. The other side of the pilot relief valve 94 is communicated by a branch pipe 98 that extends through the flange 48 to a sensor terminus at the relatively low pressure annulus between the outer surface of the insert skirt 46 and the inner surface of the vessel wall 28. Interposed in the branch line 98 is a pilot valve 100.

Downstream from the source of compressed air 82, the feed line 84 has, in sequence: a filter 104 for purging or cleansing source air; a booster pump 106; a coupled pressure switch 108 (electrically coupled to source 82) and pressure indicator 110; a filter 112 for cleansing air delivered by the pump; and a supply line pressure relieve valve 114.

When the filter system is on-stream, in the filtering mode receiving water through open inlet means 18, it will be understood that the outlet valve 74 is open. Simultaneously, the air control valve 88 is closed, as is the valve (not shown) operatively associated with the waste conduit 40. At the same time, the inactive air supply system 24 has previously pressurized the interior of the accumulator chamber 12 to about double the pressure rating of the vessel 10. By way of example, the pressure vessel 10 of a retrofitted filter system may have been rated to 150 psig while the accumulator chamber 12 has been constructed to a rating of and is pre-charged at 350 psig, which is normally maintained during on-stream operation of the filter system. Accordingly, the sensor terminus of the branch line 98, in communication with the annulus between the skirt 46 and vessel wall 28 communicates the on-stream pressure within the filter chamber 20 to the pilot valve 100 while the other branch conduit 96 for the relief valve 94 is exposed to 350 psig.

When excessive contaminants have accumulated on the filters 14, the filter system is backflushed as follows. The valve (not shown) for the inlet means 18 is closed, as is the outlet valve 74. The valve (not shown) for the waste conduit 40 is opened, draining all or most of the liquid in chamber 20, followed by opening of the air control valve 88. At this point, depending upon the amount of dirt trapped in filters 14, it will be appreciated that usually some volume of clean filtered water remains above the filter mounting plate 64 in the plenum under the lower head 60 of the accumulator chamber and within the central pipe 16. Upon opening of the control valve 88, water and air is forcefully blasted reversely back through the filter elements 14 under the force of the relatively high pressure compressed air in the accumulator chamber 12. As a result, the contaminants are driven off the filter elements by entrained water, if present, and the air blast and so flushed via the waste conduit 40 to the sludge tank. As contrasted to a precoat filter, in which backwashing may require 700–2,000 gallons of water over about 2 hours, the present invention requires but 150 gallons or less, in a comparable system, that is delivered in a one minute pulse.

In order to prevent exposing the pressure vessel 10 to an excessive pressure, it is essential that the volume of the accumulator chamber 12, and the volume of the passages coming into communication with the accumulator chamber upon opening of the control valve 88, be sized such that the equilibrium pressure resulting from the high pressure, e.g., 350 psig, backwash air volume expanding through the filters 14 and into the filter chamber 20, not exceed the pressure rating, e.g., 150 psig, of the pressure vessel 10. Thus, the combined volume of the filter chamber 20, the space above the mounting plate 64 under the lower domed head 60, the central pipe 16, the pipe 86, and the accumulator chamber 12 are sized in proportion to the volume of the accumulator chamber such that the pressure rating of the pressure vessel 10 cannot be exceeded when the valve 88 is opened.

To protect the system, e.g., in case insufficient liquid was drained from chamber 20, the relief valve 94 is provided to relieve the internal pressures, should any excess pressure occur within the system. Thus, in the case of excess pressure within the filter chamber 20, the pilot valve 100 is actuated via the branch line 88 in order to operate the relief valve 94 to open the valve 94 to open the valve for dumping through the conduit system 92.

After a charge of compressed air has been pulsed out of the accumulator chamber 12, the air control valve 88 is closed and the pump 106 actuated to re-charge the accumulator to the desired pressure. The valve for the waste conduit 40 is closed and the valve 74 and for the inlet means 18 are opened and the filter system is back on-stream.

We claim:

1. In a backflushable filter system, the improvement comprising:

a pressure vessel with an inlet and a waste outlet;
an accumulator chamber comprising a head that closes one side of said pressure vessel;
said accumulator chamber supporting a filter means within said pressure vessel on an inner end of said accumulator chamber;
first passage means defining a passage through said accumulator chamber in fluid communication with the interior of said vessel;
second passage means defining a passage for fluid communication between the interior of said accumulator chamber and said first passage means;
and a valve means for selectively opening or closing said second passage means.

2. The system of claim 1 in which:

said first passage means has an external portion that is normally closed by a pressure relief valve mounted in operative association therewith;
and in which fluid pressure sensing means communicate the interior of said pressure vessel to said relief valve otherwise than through a wall of said pressure vessel;
said relief valve being adapted to open to relieve fluid pressure through said first passage means upon said fluid pressure sensing means being subjected to a pressure within said pressure vessel in excess of a predetermined value.

3. The system of claim 2 in which:

said fluid pressure sensing means includes an annular space between an outer surface of said accumulator chamber and an internal surface of said pressure vessel.

4. The system of claim 3 in which:

said fluid pressure sensing means comprises an opening through a flange of said pressure vessel that opens into fluid communication with said annular space.

5. The system of claim 1 in which said filter means are permanent.

6. The system of claim 5 in which said filter means comprises a sintered metal.

7. The system of claim 5 in which said filter means comprises a compressed stack of edge filtration discs.

8. The system of claim 7 in which said discs comprise annular sheets of a thin metal that has been etched on one face to define radial flow passages therethrough.

9. The filter system of claim in claim 1 in which:

the volume of said accumulator chamber is proportioned relative to the volume of said first passage means, said second passage means, and the volume enclosed within said pressure vessel, in a predetermined ratio.

10. A backflushable filter support system for insertion into a pressure vessel comprising:

an accumulator chamber of annular form including a medial portion of cylindrical configuration defining a circumferential wall of said accumulator chamber;

said accumulator chamber having a radially inner wall defined by a first pipe extending through axially opposite inner and outer end walls of said chamber;

said inner end wall having means to support a backflushable filter thereon for positioning within the pressure vessel into which said support system is to be inserted;

a second pipe mounted for penetrating into fluid communication with the interior of said accumulator chamber through said outer end wall and positioned for fluid communication with an external portion of said first pipe;

and a valve means interconnected between said external portion of said first pipe and said second pipe for selectively opening or closing fluid communication there between;

said accumulator chamber being adapted to contain a fluid under a relatively high pressure and, also, adapted to be fitted as a head for closing the pressure vessel into which said accumulator chamber is to be inserted.

11. A support system as in claim 10 in which:

said accumulator chamber is fitted with a circumferential flange projecting radially outwardly relative to said circumferential all of said accumulator chamber;

said flange being formed with a hole extending therethrough in alignment with the outer surface of said circumferential wall.

12. A support system as in claim 11 in which:

said accumulator chamber and said flange are rigidly interconnected by a cylindrical skirt whose outer surface is substantially a cylindrical continuation of the outer surface of said circumferential wall.

13. A support system as in claim 10 in which:

said means to support a filter comprises a circular plate formed with spaced apart perforations that is overlain by said axially inner wall of aid accumulator chamber;

said perforations of said plate being adapted to mount a plurality of said filters.

14. A support system as in claim 13 in which:

said axially inner wall of said accumulator chamber is of a cross-sectional configuration that is dished inwardly into said accumulator chamber to define a plenum intercommunicating said perfoations and the inner end of said first pipe.

15. A support system as in claim 10 in which:

said means to support a filter is provided with a permanent filter means.

16. A support system as in claim 15 in which said filter means comprise a porous sintered metal.

17. A support system as in claim 15 in which said filter means comprises a compressed stack of edge filtration discs.

* * * * *